United States Patent
Ikitake et al.

(10) Patent No.: US 9,647,601 B2
(45) Date of Patent: May 9, 2017

(54) MOTOR CONTROL DEVICE

(71) Applicant: MITSUBISHI ELECTRIC CORPORATION, Tokyo (JP)

(72) Inventors: Yoshitaka Ikitake, Tokyo (JP); Youichi Fujita, Tokyo (JP); Satoshi Kawamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 14 days.

(21) Appl. No.: 14/898,725

(22) PCT Filed: Aug. 12, 2013

(86) PCT No.: PCT/JP2013/071803
§ 371 (c)(1),
(2) Date: Dec. 15, 2015

(87) PCT Pub. No.: WO2015/022722
PCT Pub. Date: Feb. 19, 2015

(65) Prior Publication Data
US 2016/0134225 A1 May 12, 2016

(51) Int. Cl.
G05B 19/25 (2006.01)
H02P 29/00 (2016.01)
H02P 7/03 (2016.01)
H02P 29/66 (2016.01)
H02P 29/64 (2016.01)

(52) U.S. Cl.
CPC ........... *H02P 29/0055* (2013.01); *H02P 7/05* (2016.02); *H02P 29/64* (2016.02); *H02P 29/66* (2016.02)

(58) Field of Classification Search
CPC .... H02P 29/64; H02P 7/05; H02P 6/17; F02D 2041/2065
See application file for complete search history.

(56) References Cited

U.S. PATENT DOCUMENTS

2007/0201176 A1    8/2007  Yokai et al.
2013/0069575 A1*   3/2013  Hano ............... H02P 6/165
                                                       318/400.34

FOREIGN PATENT DOCUMENTS

| JP | 4-347594 A | 12/1992 |
| JP | 8-133107 A | 5/1996 |
| JP | 2007-228775 A | 9/2007 |
| JP | 2010-28911 A | 2/2010 |
| JP | 2010-68662 A | 3/2010 |

* cited by examiner

*Primary Examiner* — Karen Masih
(74) *Attorney, Agent, or Firm* — Birch, Stewart, Kolasch & Birch, LLP (57) ABSTRACT

A coil temperature estimation unit 12 estimates the coil temperature of a motor 1 from the equivalent resistance, heat capacity and thermal resistance of the coil of the motor 1, which are given in advance, from the applied voltage to the motor 1 detected by a voltage detector 17, and from a duty ratio command value input from the outside. When a temperature abnormality deciding unit 13 decides that the coil temperature is not normal, a duty limiter 14 limits the duty ratio command value at a low value and outputs it to a FET driving circuit 15.

4 Claims, 6 Drawing Sheets

MOTOR CONTROL DEVICE

TECHNICAL FIELD

The present invention relates to a coil temperature estimation method for estimating the coil temperature of a motor, and to a motor control device for controlling the motor in accordance with the coil temperature estimated.

BACKGROUND ART

Applying voltage to a DC motor will cause heat corresponding to coil resistance and a coil temperature rise. Excessive coil temperature rise can damage a coil coating, and can cause a harmful influence such as a short circuit and generation of heat. Accordingly, it is necessary to limit the voltage application before an excessively high temperature occurs.

Thus, conventionally, there has been a device that measures the coil temperature with a temperature sensor.

In addition, there has been a device that estimates the relative temperature change of a motor by calculating the average or integral of the product of the terminal voltage of the motor and the motor current using a phenomenon that the coil resistance of the motor increases with the temperature rise (for example, see Patent Document 1).

In addition, there has been a device that estimates the coil resistance from the motor current, bus voltage and PWM (Pulse Width Modulation) time width, and calculates the coil temperature using relationships between the coil resistance and coil temperature obtained in advance (for example, see Patent Document 2).

PRIOR ART DOCUMENTS

Patent Document

Patent Document 1: Japanese Patent Laid-Open No. 8-133107/1996.
Patent Document 2: Japanese Patent Laid-Open No. 2010-28911.

DISCLOSURE OF THE INVENTION

Problems to be Solved by the Invention

As described above, the conventional devices require a temperature sensor for measuring the coil temperature or a current sensor for measuring the motor current. However, they have a problem in that it is difficult for them to be applied to a DC motor used for an electric control actuator that cannot incorporate the temperature sensor or current sensor because of the installation space.

The present invention is implemented to solve the foregoing problem. Therefore it is an object of the present invention to provide a coil temperature estimation method and a motor control device, which do not use a temperature sensor, current sensor or the like to estimate the coil temperature, and thus do not require any hardware alteration for incorporating them.

Means for Solving the Problem

A motor control device in accordance with the present invention comprises a driving circuit that carries out PWM control of voltage to be applied to a motor in accordance with a duty ratio command value; a voltage detector that detects applied voltage to the motor; a coil temperature estimator that estimates a coil temperature of the motor from coil equivalent resistance, heat capacity and thermal resistance of a coil of the motor, which are given in advance, from the applied voltage the voltage detector detects, and from the duty ratio command value; a temperature abnormality deciding unit that decides whether the coil temperature the coil temperature estimator estimates is a normal temperature or not; and a duty limiter that limits the duty ratio command value at a low value when the temperature abnormality deciding unit decides that the coil temperature is not the normal temperature, wherein the coil temperature estimator calculates power consumption W of the motor per unit time according to the following Expression, and estimates the coil temperature by calculating and integrating a coil temperature rise per unit time corresponding to the power consumption W using the heat capacity and the thermal resistance, $$W = V/R * V * f(x)$$

where V is the applied voltage the voltage detector detects, R is coil equivalent resistance given to the coil temperature estimator in advance, and f(x) is a function whose variable x is the duty ratio command value.

Advantages of the Invention

According to the present invention, it estimates the coil temperature of the motor from the coil equivalent resistance, heat capacity and thermal resistance of the coil of the motor, which are given in advance, and from the applied voltage the voltage detector detects and the duty ratio command value, thereby being able to estimate the coil temperature without using the temperature sensor, current sensor or the like. Accordingly, it can offer the motor control device that can obviate the necessity of the hardware alteration for the coil temperature estimation.

BEST MODE FOR CARRYING OUT THE INVENTION

The best mode for carrying out the invention will now be described with reference to the accompanying drawings to explain the present invention in more detail.

Embodiment 1

Figure 1:
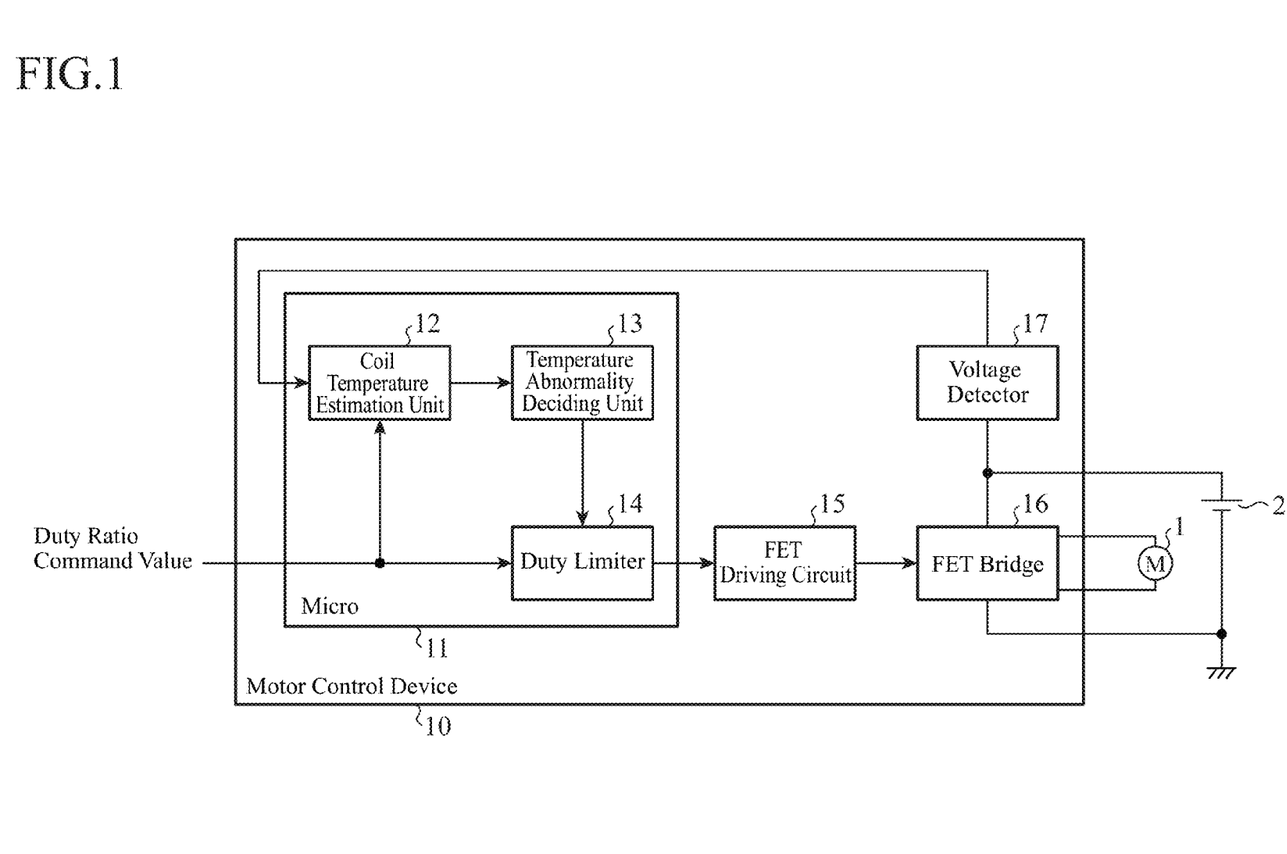
FIG. 1 is a block diagram showing a configuration of a motor control device of an embodiment 1 in accordance with the present invention.

FIG. 1 shows a configuration when applying a motor control device 10 of the embodiment 1 to a motor 1. The motor control device 10 shown in FIG. 1 comprises a microcomputer (called "micro" from now on) 11 that controls the motor 1; a FET (Field Effect Transistor) driving circuit 15 that generates a PWM signal corresponding to the duty ratio the micro 11 outputs; a FET bridge 16 that chops the voltage of a DC power supply 2 in response to the PWM signal and applies it to the motor 1; and a voltage detector 17 that detects the voltage applied from the DC power supply 2 to the motor 1 (referred to as "applied voltage" from now on) via the FET bridge 16.

Incidentally, in the example of FIG. 1, although the FET bridge 16 (three-phase inverter, for example) with a plurality of FETs connected in a bridge controls the power from the DC power supply 2 to the motor 1, switching elements other than the FETs (IGBTs: Insulated Gate Bipolar Transistors, for example) can also be used.

For example, when applying the motor 1 to an actuator for driving a waste gate (WG) valve that switches an exhaust passage of a turbocharged engine, an engine controller calculates the duty ratio of the motor 1 in such a manner that the difference between the actual stroke and the reference stroke of the actuator is placed to zero, and sends the information to the motor control device 10 as a duty ratio command value.

Incidentally, it goes without saying that the motor control device 10 of the embodiment 1 is applicable to a motor other than the motor for the WG actuator. For example, it can be applied to a motor for an actuator for driving an exhaust gas recirculation (EGR) valve.

In addition, a configuration is also possible in which the motor control device 10 calculates the duty ratio command value.

The micro 11 executes functions of a coil temperature estimation unit 12 that estimates the coil temperature of the motor 1, of a temperature abnormality deciding unit 13 that decides from the estimated coil temperature an excessive temperature rise of the motor 1, and of a duty limiter 14 that limits the duty ratio command value input from the outside in accordance with the decision result of the temperature abnormality deciding unit 13 by successively reading out a program recorded in a built-in memory.

Figure 2:
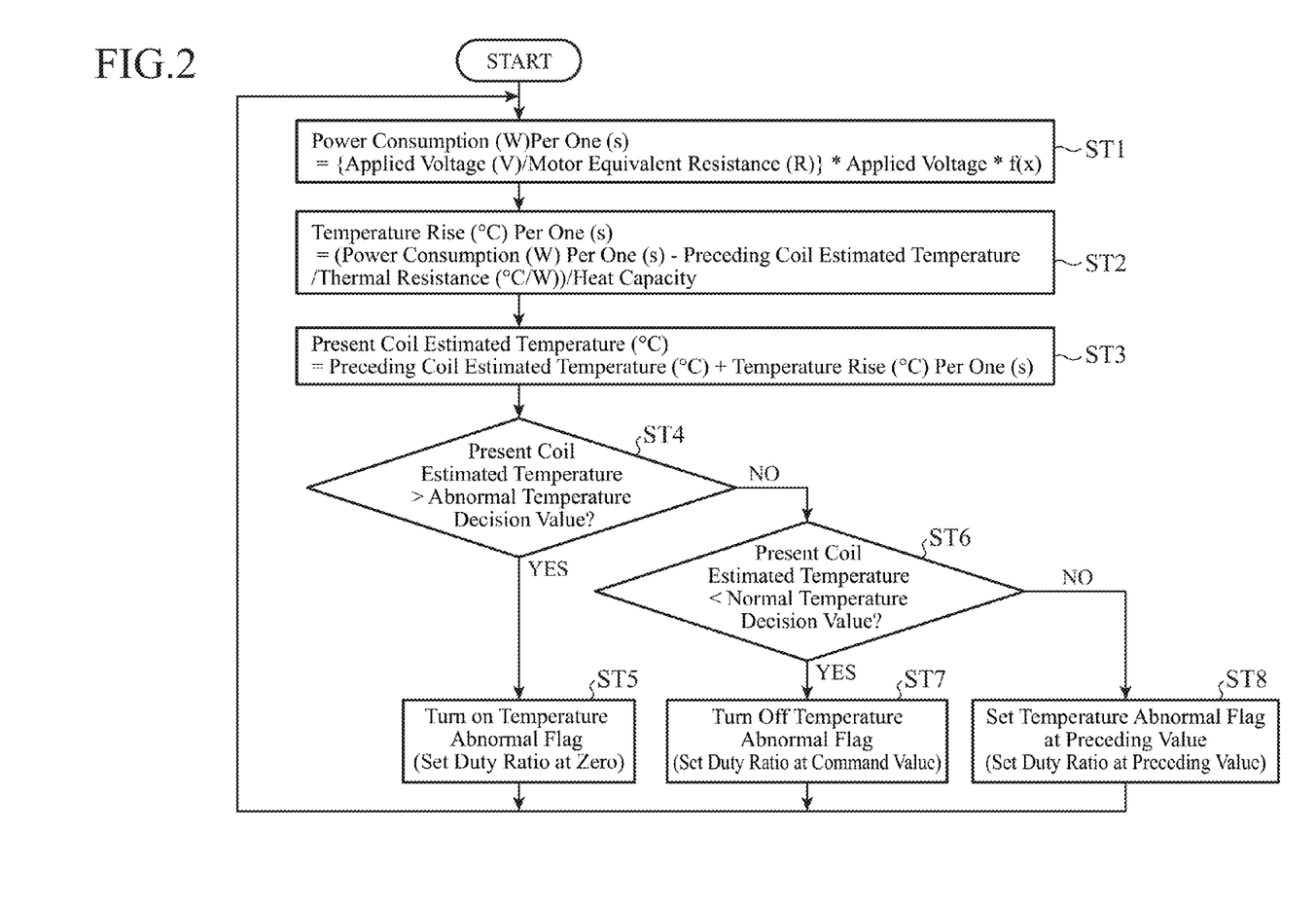
FIG. 2 is a flowchart illustrating the operation of the motor control device of the embodiment 1.

Next, referring to the flowchart shown in FIG. 2, the operation of the micro 11 will be described. The micro 11 repeats the following processing at every prescribed sampling time (one second, for example).

First, at steps ST1-ST3, the coil temperature estimation unit 12 estimates the coil temperature of the motor 1 according to the following Expressions (1)-(3).

$$W=(V/R)*V*f(x) \quad (1)$$

$$\Delta T=(W-Tz/Rth)/C \quad (2)$$

$$T=\Delta T+Tz \quad (3)$$

Here, W is the power consumption of the motor 1 per sampling time, V is the applied voltage to the motor 1 which is detected by the voltage detector 17 and is input to the coil temperature estimation unit 12, $f(x)$ is a function whose variable x is the duty ratio command value that is input from the outside, R is the coil equivalent resistance of the motor 1, C is the heat capacity of the coil of the motor 1, and Rth is the thermal resistance of the coil of the motor 1.

In addition, T is the estimated coil temperature at the present sampling time, $\Delta T$ is a temperature rise per sampling time, and Tz is the estimated coil temperature at the preceding sampling time.

In the foregoing Expressions (1)-(3), it is assumed that the coil equivalent resistance R, heat capacity C, and thermal resistance Rth are given in advance to the coil temperature estimation unit 12.

For example, while applying voltage continuously to the motor 1 at the duty ratio 1, the motor saturation temperature is obtained by experiment. Here, it is obtained under the most rigid conditions supposed so as to control the motor 1 on the safety side. Then the motor equivalent resistance R is obtained from a motor locked current flowing when the motor 1 is locked. In addition, the time in which the temperature reaches 63.2% of the motor saturation temperature is defined as the temperature rise time constant [s]. Then, the thermal resistance Rth [C/W] is obtained from the 63.2% of the motor saturation temperature and the temperature rise time constant, and the heat capacity C [J/C] is obtained from the thermal resistance Rth and temperature rise time constant.

Details of the function $f(x)$ of the duty ratio command value will be described later.

The coil temperature estimation unit 12 calculates at step ST1 the power consumption W of the motor 1 per sampling time by the foregoing Expression (1), calculates at step ST2 the temperature rise $\Delta T$ per sampling time by the foregoing Expression (2), and estimates at step ST3 the present estimated coil temperature T by integrating the temperature rise $\Delta T$ per sampling time according to the foregoing Expression (3).

At the subsequent steps ST4-ST8, the temperature abnormality deciding unit 13 compares the estimated coil temperature T with the decision value of the normal/abnormal temperature given in advance, decides whether the temperature rise of the motor 1 occurs or not, and sets ON/OFF of the temperature abnormal flag.

Figure 3:
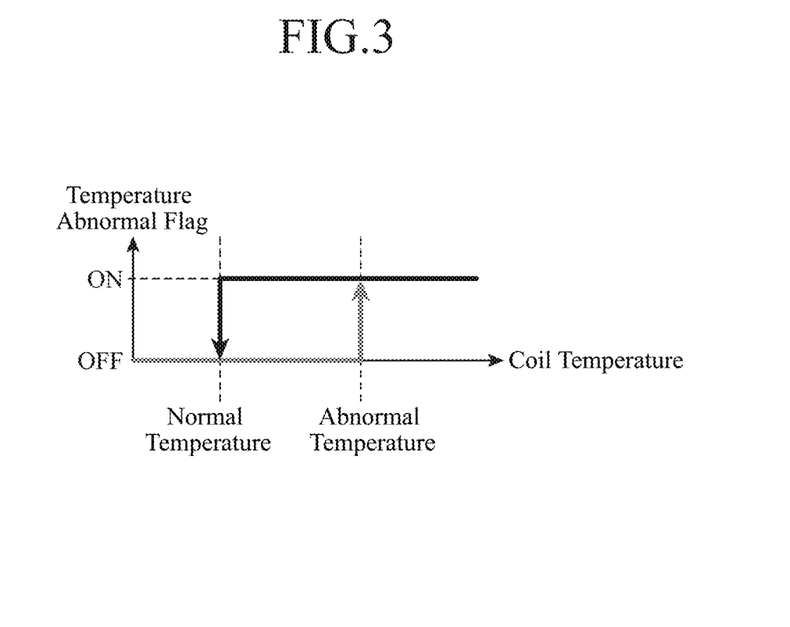
FIG. 3 is a graph illustrating coil temperature abnormality decision processing of the motor control device of the embodiment 1.

Here, referring to the graph of FIG. 3, the abnormality decision processing of the coil temperature will be described. On the graph of FIG. 3, the vertical axis shows ON/OFF of the temperature abnormal flag, and the horizontal axis shows the coil temperature. The decision value of the abnormal temperature is set higher than the decision value of the normal temperature, and the hysteresis is provided between the decision value of the normal temperature and the decision value of the abnormal temperature.

If the estimated coil temperature T is higher than the decision value of the abnormal temperature at step ST4 ("YES" at step ST4), the temperature abnormality deciding unit 13 decides that the motor 1 has a temperature rise, and turns on the temperature abnormal flag (step ST5). In contrast, when the estimated coil temperature T is not higher than the decision value of the abnormal temperature ("NO" at step ST4), the temperature abnormality deciding unit 13 successively compares the estimated coil temperature T with the decision value of the normal temperature (step ST6), and if the estimated coil temperature T is less than the decision value of the normal temperature ("YES" at step ST6), it decides that the temperature of the motor 1 is within the normal range, and turns off the temperature abnormal flag (step ST7).

On the other hand, when the estimated coil temperature T is between the decision value of the abnormal temperature and the decision value of the normal temperature ("NO" at step ST6), the temperature abnormality deciding unit 13 keeps the temperature abnormal flag at the state at the preceding sampling time (step ST8).

If the temperature abnormal flag set by the temperature abnormality deciding unit 13 is ON, the duty limiter 14 limits the duty ratio command value input from the outside to a lower duty ratio (zero, for example), and outputs it to the FET driving circuit 15. In contrast, when the temperature abnormal flag is OFF, the duty limiter 14 outputs the duty ratio command value as it is to the FET driving circuit 15.

The FET driving circuit 15 generates a PWM signal which is pulse-width modulated in accordance with the duty ratio the duty limiter 14 outputs, and applies it to the gate terminals of the FETs constituting the FET bridge 16 to bring them into or out of conduction. Thus, while the motor 1 is at the normal temperature, the motor control device 10 applies the voltage in accordance with the duty ratio command value, and when the motor 1 has the abnormal temperature, it limits the voltage application to stop the excessive temperature rise, thereby protecting the motor 1. In addition, controlling the width of the hysteresis between the abnormal and normal decisions makes it possible to control the time period for limiting the voltage application until the motor 1 returns from the abnormal temperature to the normal temperature.

Next, the function f(x) of the duty ratio command value will be described.

Figure 4:
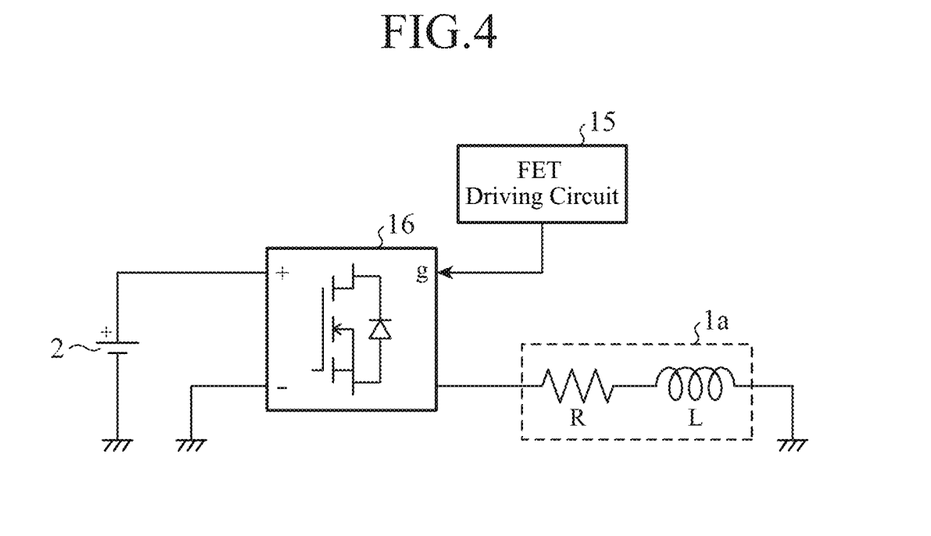
FIG. 4 is a diagram showing a simulation model of the power an RL load consumes which is driven by rectangular wave-like PWM voltage.

FIG. 4 is a simulation model of the power an RL load 1a consumes which is driven by the rectangular wave PWM voltage. The example of FIG. 4 employs instead of the motor 1 the RL load 1a with resistance R and inductance L connected in series. Strictly speaking, the power the motor 1 consumes differs from that the RL load 1a consumes. However, on conditions that the generation of heat is large, the induced voltage due to the rotation of the motor 1 is small and a large current is flowing. Accordingly, the motor 1 can be considered to be approximated by the RL simply. Thus, the following simulation is made as to the relationships between the power, which is consumed when applying the rectangular wave PWM voltage to the RL load 1a, and the duty ratio so as to examine the relationships between the power consumption and the duty ratio command value.

In the example of FIG. 4, the rectangular wave voltage is applied to the RL load 1a via the FET bridge 16. It is assumed here that the DC power supply 2 to the FET bridge 16 is set at 10 V. In addition, the FET driving circuit 15 generates a rectangular wave signal of 500 Hz in the interior, and generates a PWM signal by sweeping the duty ratio of the rectangular wave signal from zero to one over 10 seconds in accordance with the duty ratio command value input from the outside.

FIG. 5-FIG. 9 show results of the simulations made by the configuration of FIG. 4.

FIG. 5-FIG. 8 are graphs showing results of measuring the current flowing through the RL load 1a and the voltage applied thereto with a virtual multimeter on the simulation which is made as to the power consumption while varying the L/R value of the RL load 1a. The resistance R is 1Ω throughout the simulations, and the inductance L is varied from 0.1 mH to 0.8 mH. FIG. 5(a)-FIG. 8(a) are graphs when sweeping the duty ratio from zero to one over 10 seconds, and FIG. 5(b)-FIG. 8(b) show enlargements of parts of them.

Figure 9:
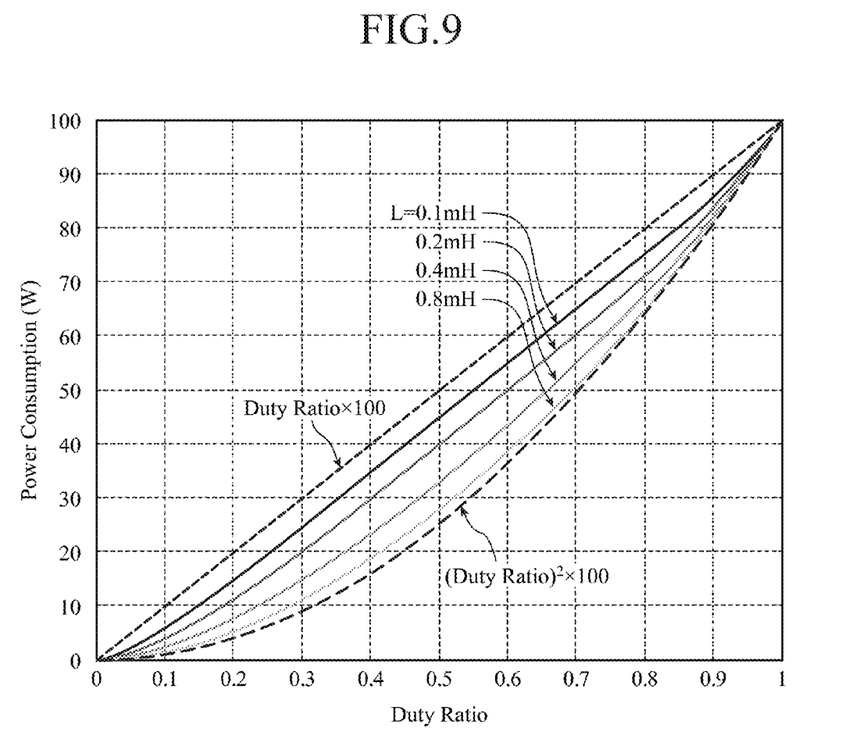
FIG. 9 is a graph showing the power consumption of the RL load for a duty ratio command value.

FIG. 9 is a graph showing the power consumption of the RL load 1a for the duty ratio command values. It is assumed that the power consumption shown in FIG. 9 is the results of calculating instantaneous values of the power consumed through the RL load 1a by multiplying the current and voltage measured with the multimeter, followed by averaging them through filter processing.

Figure 5:
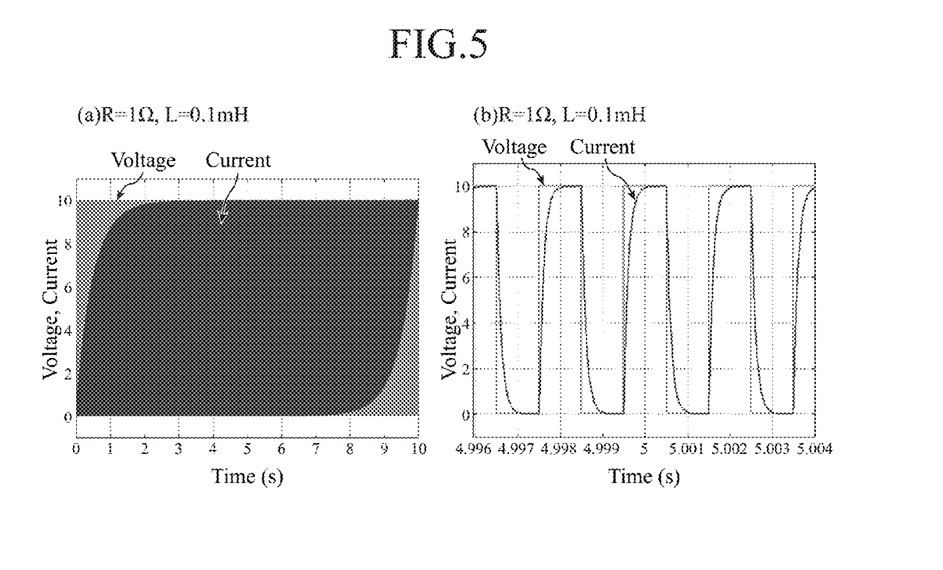
FIG. 5(a) and FIG. 5(b) are graphs showing a result of measuring a current flowing through the LR load with R=1Ω and L=0.1 mH, and the voltage applied to it.
Figure 6:
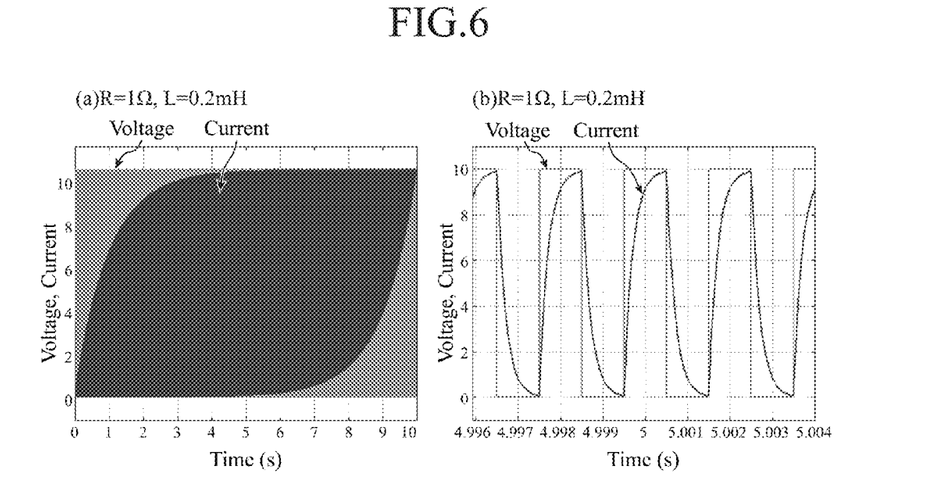
FIG. 6(a) and FIG. 6(b) are graphs showing a result of measuring a current flowing through the LR load with R=1Ω and L=0.2 mH, and the voltage applied to it.
Figure 7:
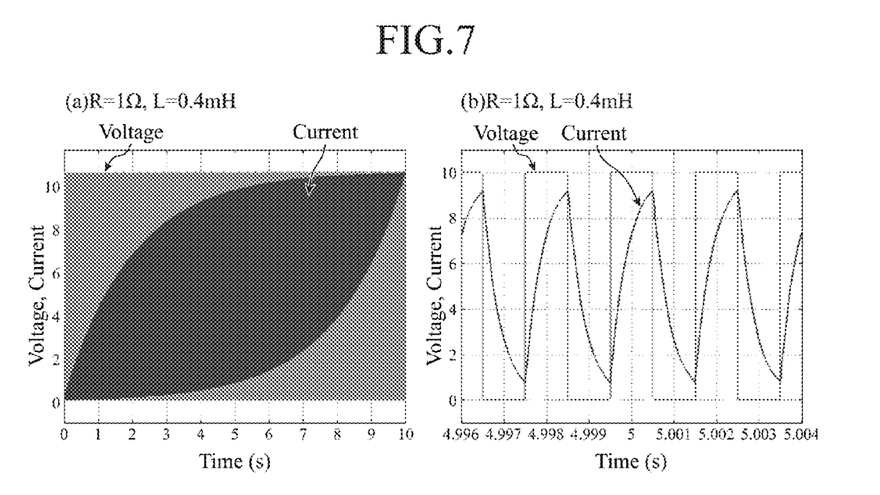
FIG. 7(a) and FIG. 7(b) are graphs showing a result of measuring a current flowing through the LR load with R=1Ω and L=0.4 mH, and the voltage applied to it.
Figure 8:
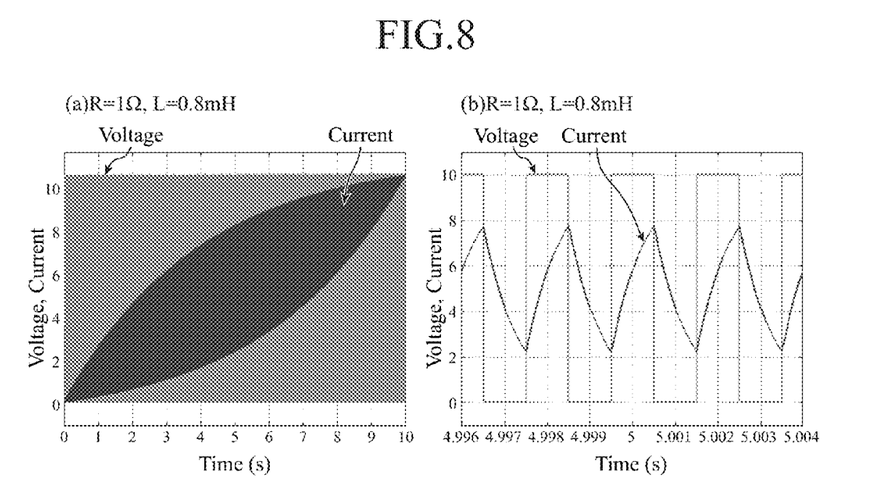
FIG. 8(a) and FIG. 8(b) are graphs showing a result of measuring a current flowing through the LR load with R=1Ω and L=0.8 mH, and the voltage applied to it.

Since the DC power supply 2 is fixed at 10 V, and the resistance R of the RL load 1a is fixed at 1Ω in the simulation, the power consumption is always 100 W when the duty ratio command value is one. It is seen from FIG. 5(b) to FIG. 8(b) that even if the voltage is applied to the RL load 1a, the current does not increase immediately because of the time constant τ (=L/R) of the resistance R and inductance L, and has a first order lag. If the time constant τ is small as compared with the driving period P (500 Hz in the example) of the PWM signal, the first order lag of the current at the voltage application is also small as shown in FIG. 5(b), and the power consumption forms a curve close to the straight line of duty ratio*100 shown in FIG. 9. Gradually increasing the inductance L will increase the time constant τ for the driving period P of the PWM signal and will also increase the first order lag of the current at the voltage application as shown in FIG. 8. Accordingly, it is seen from FIG. 9 that the power consumption gradually approaches the curve of (duty ratio)$^2$*100 from the straight line of the duty ratio*100.

Accordingly, the function f(x) is given by the following Expression (4).

$$f(x)=(\text{duty ratio command value})^n*100 \tag{4}$$

where, $1 \leq n \leq 2$.

From FIG. 9, n is placed at n=1 in Expression (4) when the time constant τ of the motor 1 is small as compared with the driving period P of the PWM signal (P>τ). In contrast, n is placed at 1<n≤2 when the time constant τ of the motor 1 is large as compared with the driving period P of the PWM signal (P≤τ). Thus, the value n can be determined in accordance with the time constant τ of the motor 1. It is possible to calculate it by the simulation as described above, or to determine it by measuring the relationships between the duty ratio command value and the power consumption using a real device.

In addition, the duty ratio command value of Expression (4) is assumed to be the average value per sampling time. In addition, the function f(x) can be set in the coil temperature estimation unit 12 in the form of a lookup table.

As described above, according to the embodiment 1, the motor control device 10 comprises the FET driving circuit 15 that carries out PWM control of the voltage to be applied to the motor 1 in accordance with the duty ratio command value; the FET bridge 16 that drives the motor 1 in response to the PWM control of the FET driving circuit 15; the voltage detector 17 that detects the voltage applied to the motor 1 via the FET bridge 16; the coil temperature estimation unit 12 that estimates the coil temperature of the motor 1 from the coil equivalent resistance, heat capacity and thermal resistance of the coil of the motor 1, which are given in advance, from the applied voltage the voltage detector 17 detects, and from the duty ratio command value; the temperature abnormality deciding unit 13 that decides whether the coil temperature the coil temperature estimation unit 12 estimates is the normal temperature or not; and the duty limiter 14 that limits the duty ratio command value at a low value when the temperature abnormality deciding unit 13 decides that the coil temperature is not the normal temperature. Accordingly, it can estimate the coil temperature without using the temperature sensor, current sensor and the like. As a result, it can offer the motor control device 10 that obviates the necessity of the hardware alteration for the temperature estimation.

In addition, according to the embodiment 1, the coil temperature estimation unit 12 is configured in such a manner that it calculates the power consumption of the motor 1 per unit time from the foregoing Expression (1), and estimates the coil temperature by calculating and integrating the coil temperature rise per unit time, which corresponds to the power consumption. In the foregoing Expression (1), introducing the function f(x) considering the time constant τ of the motor 1 makes it possible to estimate the coil temperature of the motor with different characteristics at high accuracy.

In addition, according to the embodiment 1, the temperature abnormality deciding unit 13 is configured in such a manner that it decides that the coil temperature the coil temperature estimation unit 12 estimates is normal when the coil temperature is lower than a normal temperature decision value, decides that the coil temperature is not normal when it is higher than the abnormal temperature decision value which is higher than the normal temperature decision value, and continues the preceding decision result when the coil temperature is not lower than the normal temperature decision value and is not higher than the abnormal temperature decision value. Accordingly, it can control the time for limiting the voltage application, during which the motor 1 returns from the abnormal temperature to the normal temperature, by adjusting the width of the hysteresis between the normal temperature decision value and the abnormal temperature decision value.

Incidentally, it is to be understood that variations of any components of the individual embodiments or removal of any components of the individual embodiments is possible within the scope of the present invention.

INDUSTRIAL APPLICABILITY

As described above, since a motor control device in accordance with the present invention is able to estimate the coil temperature of a motor without altering hardware, it is suitable for an application to a DC motor for driving an electric control actuator to which a sensor cannot be added because of a problem of an installation space.

DESCRIPTION OF REFERENCE SYMBOLS

1 motor; 1a RL load; 2 DC power supply; 10 motor control device; 11 micro; 12 coil temperature estimation unit; 13 temperature abnormality deciding unit; 14 duty limiter; 15 FET driving circuit; 16 FET bridge; 17 voltage detector.

What is claimed is:

1. A motor control device comprising:
a driving circuit that carries out PWM (Pulse Width Modulation) control of voltage to be applied to a motor in accordance with a duty ratio command value;
a voltage detector that detects applied voltage to the motor;
a coil temperature estimator that estimates a coil temperature of the motor from coil equivalent resistance, heat capacity and thermal resistance of a coil of the motor, which are given in advance, from the applied voltage the voltage detector detects, and from the duty ratio command value;
a temperature abnormality decider that decides whether the coil temperature the coil temperature estimator estimates is a normal temperature or not; and
a duty limiter that limits the duty ratio command value at a low value when the temperature abnormality decider decides that the coil temperature is not the normal temperature, wherein
the coil temperature estimator calculates power consumption W of the motor per unit time according to the following Expression, and estimates the coil temperature by calculating and integrating a coil temperature rise per unit time corresponding to the power consumption W using the heat capacity and the thermal resistance, $$W = V/R * V * f(x)$$

where V is the applied voltage the voltage detector detects, R is coil equivalent resistance given to the coil temperature estimator in advance, and f(x) is a function whose variable x is the duty ratio command value.

2. The motor control device according to claim 1, wherein the function f(x) satisfies the following Expression, $$f(x) = (\text{duty ratio command value})^n * 100$$

where $1 \leq n \leq 2$.

3. The motor control device according to claim 2, wherein n of the function f(x) is determined by a time constant that is determined from the coil equivalent resistance and inductance of the coil of the motor.

4. The motor control device according to claim 1, wherein the temperature abnormality decider decides that the coil temperature the coil temperature estimator estimates is normal when the coil temperature is lower than a normal temperature decision value, decides that the coil temperature is not normal when the coil temperature is higher than an abnormal temperature decision value which is higher than the normal temperature decision value, and continues a preceding decision result when the coil temperature is not lower than the normal temperature decision value and is not higher than the abnormal temperature decision value.

* * * * *